United States Patent
Fallon

(10) Patent No.: US 6,964,549 B2
(45) Date of Patent: Nov. 15, 2005

(54) LICENSE PLATE MOUNTING FASTENER

(76) Inventor: Phoenix P. A. Fallon, 1107 Paseo Las Nubes, Oxnard, CA (US) 93030

( * ) Notice: Subject to any disclaimer, the term of this patent is extended or adjusted under 35 U.S.C. 154(b) by 0 days.

(21) Appl. No.: 10/396,852

(22) Filed: Mar. 25, 2003

(65) Prior Publication Data

US 2003/0180119 A1 Sep. 25, 2003

Related U.S. Application Data

(60) Provisional application No. 60/367,882, filed on Mar. 25, 2002.

(51) Int. Cl.$^7$ ............................................. F16B 37/14
(52) U.S. Cl. ..................................... 411/377; 411/372.6
(58) Field of Search ................................. 441/377, 373, 441/372.6, 372.5, 431

(56) References Cited

U.S. PATENT DOCUMENTS

| | | | | |
|---|---|---|---|---|
| 1,333,015 A | * | 3/1920 | Freile | 200/329 |
| 1,805,937 A | * | 5/1931 | Berge | 411/372 |
| 1,980,758 A | * | 11/1934 | Komorous | 40/307 |
| 3,065,660 A | * | 11/1962 | Puterbaugh | 411/530 |
| 3,971,289 A | * | 7/1976 | Chaivre | 411/430 |
| 4,136,598 A | * | 1/1979 | Hughes | 411/372 |
| 4,601,624 A | * | 7/1986 | Hill | 411/373 |
| 4,890,967 A | * | 1/1990 | Rosenbaum | 411/377 |
| 5,068,956 A | * | 12/1991 | Malewicz | 29/437 |
| 5,879,117 A | * | 3/1999 | Chen et al. | 411/373 |
| 5,980,178 A | * | 11/1999 | Ono | 411/373 |
| 5,988,966 A | * | 11/1999 | Chen et al. | 411/372 |

* cited by examiner

*Primary Examiner*—Flemming Saether
(74) *Attorney, Agent, or Firm*—Donn K. Harms

(57) ABSTRACT

A license plate fastener assembly useful in attaching a license plate to a motor vehicle includes a cup-like resilient adapter provided with an annular base surface conformed to receive the license plate fastener. The skirt of the adapter surrounding the fastener head is provided with a peripheral bead that is captured in an interior recess of a covering cap that opposes the plate surface once installed, thereby imparting partial tension to the adapter to develop frictional variations against the plate. The cap also includes an exterior circular depression in which variously marked plugs are receivable.

5 Claims, 2 Drawing Sheets

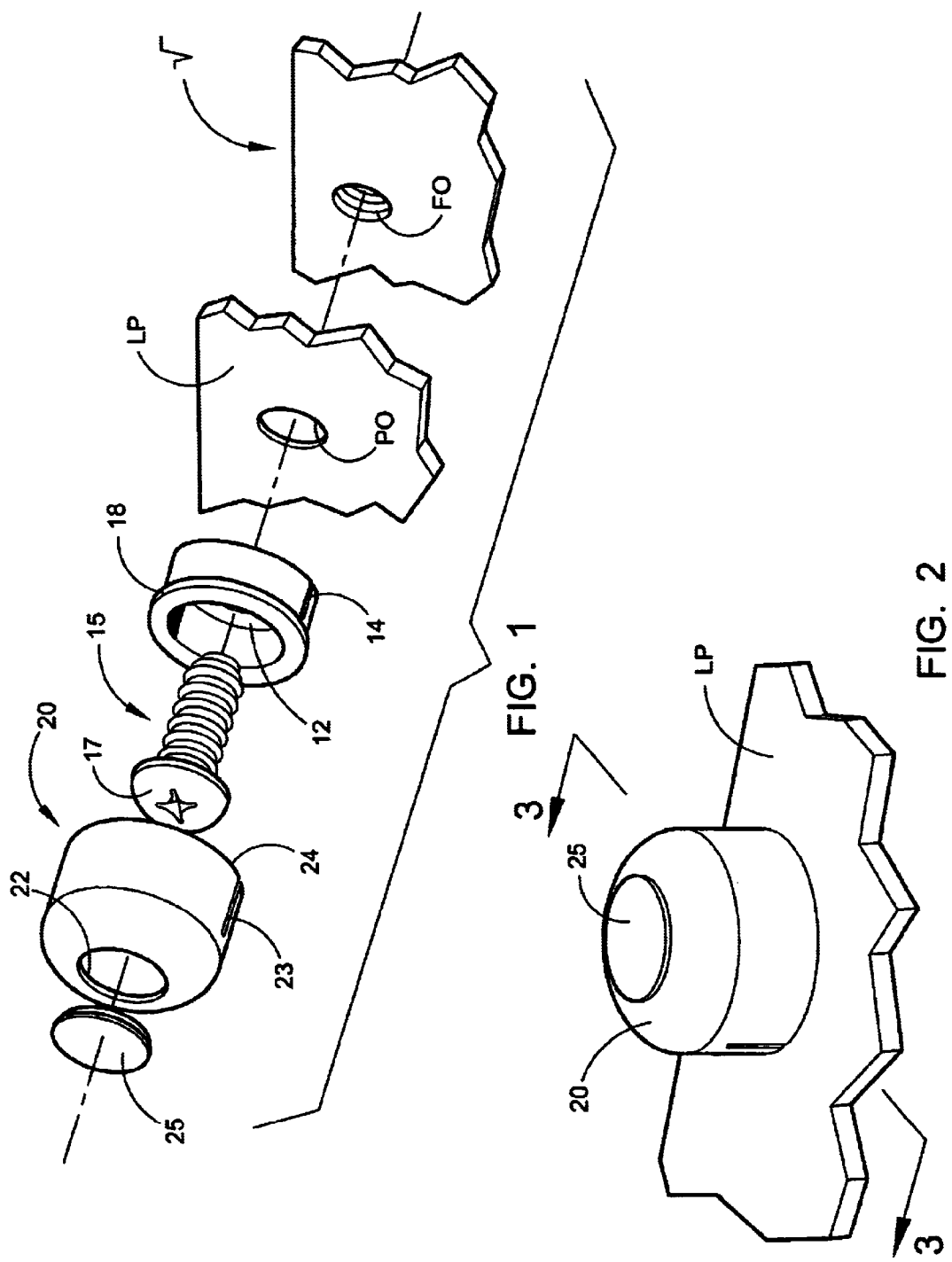

LICENSE PLATE MOUNTING FASTENER

REFERENCE TO RELATED APPLICATIONS

This application claims the benefit of the earlier filing date of the Provisional Application Ser. No. 60/367,882 filed on Mar. 25, 2002.

BACKGROUND OF THE INVENTION

1. Field of the Invention

The present invention relates to license plate fasteners, and more particularly to ornamental fastener head covers that also function to attenuate transmission into the license plate of vibration exciting inputs.

2. The Prior Art

The installation of a license plate onto the front and rear license plate mounts of a motor vehicle is a widely practiced event. Typically, the license plate is formed as a thin metal stamping of a generally rectangular planform that is provided with plural fastener openings along the edges thereof. Since each license plate set is stamped with a unique set of raised alphanumeric symbols there is inherently an uneven stress distribution impressed into the plate during the stamping, distorting the plate surface by these varying levels of pre-stress. One therefore rarely obtains a license plate that is perfectly flat. Of course, the vehicle manufacturer provides only a flat mounting surface and these pre-stress distortions are therefore a constant source of rattling and other noise.

These uneven stress levels also affect the efficacy of any mounting process. Typically the vehicle manufacturer provides fastening holes in the license plate mount that are then threadably captured to various levels of compression by machine screws or other fasteners inserted and turned by the vehicle owner. Quite often either excessive or insufficient levels of compression result and in both instances plate vibrations are produced either due to the loosening of the fastener or permanent distortion of the plate thickness itself. This inadequate fastening process is then rendered even more offensive by the poor visual presentation of the exposed fastener ends. A visually attractive fastener arrangement that also includes vibration attenuating structures is therefore universally desired and it is one such fastener arrangement that is disclosed herein.

SUMMARY OF THE INVENTION

Accordingly, it is the general purpose and object of the present invention to provide a resilient annular fastener seat that is engaged by the fastener head and that extends an tubular skirt about the head for capturing interior deformations of a decorative cover.

Other objects of the invention are to provide a decorative cover assembly that may be engaged over a license plate fastener.

Yet further objects of the invention are to provide a decorative license plate fastener cover that is also useful in attenuating the vibrations of the license plate.

Additional objects of the invention are to provide a decorative fastener cover provided with a recess for receiving a mating plug variously inscribed with a mark or logo.

Briefly, these and other objects are accomplished within the present invention by providing a generally tubular insert or adaptor made of a resilient material structure like Nylon defined by an annular first end surface surrounded by a peripheral skirt. This annular first end surface is then engageable in the manner of a washer by the head of a license plate fastener that is otherwise surrounded by the skirt with the free edge of this skirt then provided with an exterior peripheral bead shaped for radial capture in an interior recess formed in a domed, decorative covering cap. A circular seat provided on the domed cap exterior is then useful and conformed to receive one of variously marked plugs to match the logo, style or mark of the vehicle manufacturer or any other style or symbol.

Preferably the captured skirt dimension is about equal to the adjacent surrounding dimensions of the domed cap. The free edge of the cap therefore projects around the washer surface to make contact with the secured plate, opposing any local plate distortions and thereby attenuating any vibratory modes therein. Those in the art will appreciate that this geometric arrangement is particularly useful in localizing most of the vibration energy absorption within the interface between the screw head, the resilient washer and the captured plate, particularly when the cap is made of a somewhat harder material structure like ABS, or even metal. In this manner the hard attributes of decorative coatings like chrome plate are useful also in the attenuation task. Thus all the decorative desires and also those of energy absorption are accommodated in a single device.

BRIEF DESCRIPTION OF THE DRAWINGS

FIG. 1 is a perspective illustration, separated by parts, of the inventive license plate fastener assembly;

FIG. 2 is yet another perspective illustration of the inventive license plate fastener assembly, in its combined form;

DESCRIPTION OF THE PREFERRED EMBODIMENT

Figure 3:
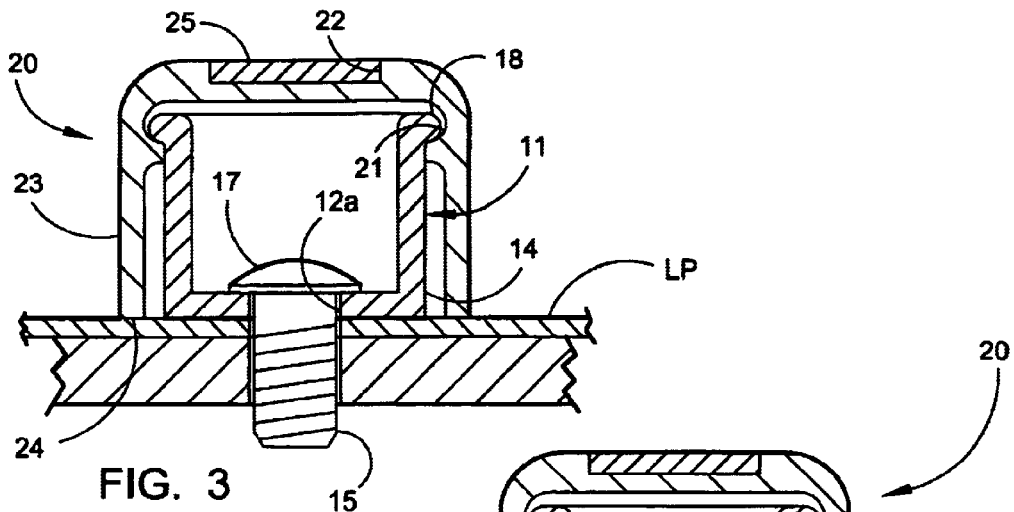
FIG. 3 is a sectional side view taken along line 3—3 of FIG. 2.

As shown in FIGS. 1–3, the inventive license plate fastening assembly, generally designated by the numeral 10, includes a resilient adapter 11 defined by an annular end surface 12 surrounded about its exterior edge by a tubular skirt 14, the interior dimension of the skirt accommodating the receipt of the head 17 of a machine screw 15 conformed to pass its screw shaft 16 through the annulus 12a of the annular surface 12 into the opening PO of a license plate LP to threadably engage a fastener opening FO on the vehicle V. The free edge of skirt 14 is then provided with an exteriorly directed peripheral bead 18 dimensioned for mating receipt in an interior recess 21 formed within the interior of a domed ornamental cover cap 20 that is pressed onto the adapter 11 once the machine screw is driven home. The exterior end surface of cap 20 is then further provided with a circular seat 22 into which a circular plug 25 bearing a desired mark, style, symbol or logo is fitted. Unlike the resilient adapter 11, cap 20 may be formed of a harder material like ABS or even metal, and may even include hard coating like chrome plating.

Preferably the skirt dimension between the annular surface 12 and the bead 18 is substantially equal to the dimension between the recess 21 and the edge 24 around the receiving opening of the cap on the end of its tubular segment 23, or just slightly less. In consequence, once the exterior impact is applied to mount the cap bead 18 is captured in its recess to apply a small amount of residual tension to the skirt 14. This then relieves the interface between the annular surface 12 and the opposing surface of license plate LP in response to the flexing of the plate, providing an area of varying contact pressure that resolves itself into corresponding frictional components.

Those skilled in the art will appreciate that a thin metal plate that is stamped with raised lettering will invariably resolve the resulting plate stresses into plate deflections. Should an external point force be applied to flatten a local plate deflection a corresponding relief deflection will appear someplace else. Simply, once surface distortions are stamped into a thin, originally flat plate the resulting internal stresses can only be resolved by out of plane plate flexure and it is these plate deflections that are at the core of most license plate rattling. These effects and their inventive resolution are illustrated by reference to FIGS. 4a and 4b.

Figure 4A:
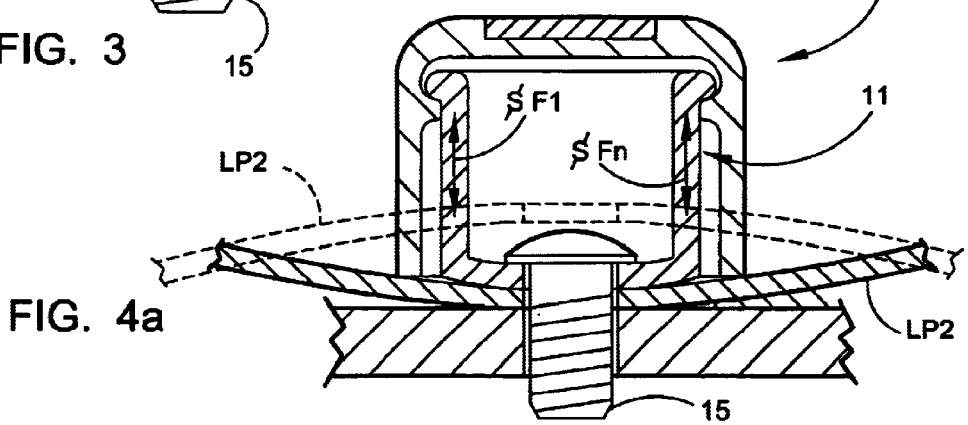
FIGS. 4a and 4b are diagrammatic illustrations, with the flexures exaggerated, of the local energy transfer and dissipation paths that take place within the inventive license plate fastener.
Figure 4B:
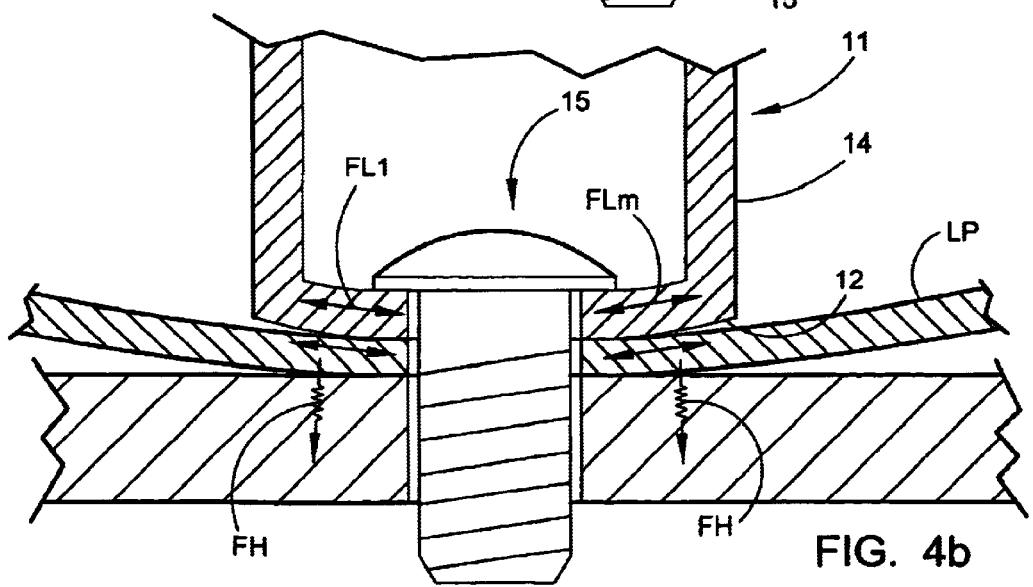

More precisely, as shown in FIG. 4a a license plate LP is shown to include a flexed shape LP1 adjacent the unmounted plate opening PO1 which is then flattened locally into the plate flexure shape LP2 that is flattened against the fastener opening FO of the vehicle V to produce a flexure shape LP2. This then raises the contact against the free edge 24 of the tubular portion of cap 20 relative the contact plane of adaptor 11, applying small stretching forces SF1–SFn into the adapter skirt 14. By reference to FIG. 4b these small stretching forces SF1–SFn then resolve themselves into varying friction levels FL1–FLm at the fastener interface. Thus the varying flexures associated with a rattle are inventively resolved into varying frictional contact, converting the acoustic energy into frictional heat FH, of course, at the microscopic level. In this manner a decorative item is effectively used to resolve a persistent annoying problem.

Obviously, many modifications and variations can be effected without departing from the spirit of the invention instantly taught. It is therefore intended that the scope of the invention be determined solely by the claims appended hereto.

I claim:

1. A decorative fastener covering assembly useful in mounting a license plate convolved by internal stresses in the course of stamping to the body of a motor vehicle and attenuating the vibrations thereof caused by the elastic deformations of the surface convolutions of the plate, comprising:

a threaded fastener defined by a head and a threaded shank;

a resilient adapter defined by an annular surface and a tubular skirt extending orthogonally from the periphery of said surface on first side of said surface, said annular surface being dimensioned to receive said shank through the annulus thereof, said skirt being dimensioned to surround said head of said fastener and said skirt further including a radially projecting rounded peripheral bead formed on the free edge of said skirt;

a domed cap including a tubular segment having a distal exial edge conformed to receive said adapter in the interior thereof, said cap including on the interior of said tubular segment a conforming recess for receiving said peripheral bead with the elastic extensions of said skirt, the axial dimension of the skirt between said peripheral bead and said annular surface is slightly less than the axial dimension of the tubular segment between said recess and said edge, whereby said edge effects a resilient compressive engagement of said license plate enhanced by the deflection of said license plate along said recess toward said domed cap.

2. Apparatus according to claim 1 further comprising:

a circular depression formed on the exterior of said cap; and a conforming plug receivable in said depression.

3. Apparatus according to claim 2, wherein:

said plug is selected from an assortment of various plugs.

4. Apparatus according to claim 3, wherein:

said assortment of plugs includes plugs marked with symbols adapted to be associated with said motor vehicle.

5. Apparatus according to claim 3, wherein:

said assortment of plugs includes decorative coloring associated with the coloring adapted to be of said motor vehicle.

* * * * *